(12) United States Patent
Bolser

(10) Patent No.: US 7,066,375 B2
(45) Date of Patent: Jun. 27, 2006

(54) ALUMINUM COATING FOR THE CORROSION PROTECTION OF WELDS

(75) Inventor: David R. Bolser, Florissant, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/833,358

(22) Filed: Apr. 28, 2004

(65) Prior Publication Data

US 2005/0242158 A1 Nov. 3, 2005

(51) Int. Cl.
*B23K 20/12* (2006.01)
*B23K 31/02* (2006.01)

(52) U.S. Cl. .................... 228/114; 228/112.1; 228/113; 228/114.5; 228/199; 228/214; 427/192

(58) Field of Classification Search ................ 228/2.1, 228/112.1, 198; 427/192; 219/73.11, 76.1, 219/118, 121.41
See application file for complete search history.

(56) References Cited

U.S. PATENT DOCUMENTS

| | | | | |
|---|---|---|---|---|
| 2,916,397 A | * | 12/1959 | Chin et al. | 427/329 |
| 3,135,047 A | * | 6/1964 | Houser | 228/216 |
| 3,301,992 A | * | 1/1967 | Seeloff | 219/105 |
| 3,769,068 A | * | 10/1973 | Yamagishi et al. | 427/299 |
| 3,797,087 A | * | 3/1974 | Allardyce et al. | 29/890.034 |
| 3,827,139 A | * | 8/1974 | Norteman | 228/151 |
| 3,859,061 A | * | 1/1975 | Speirs et al. | 428/614 |
| 4,331,286 A | * | 5/1982 | Miyazaki et al. | 228/198 |
| 5,302,414 A | * | 4/1994 | Alkhimov et al. | 427/192 |
| 5,599,467 A | * | 2/1997 | Okabe et al. | 219/118 |
| 5,692,726 A | * | 12/1997 | Adachi et al. | 251/368 |
| 5,915,743 A | * | 6/1999 | Palma | 29/402.18 |
| 6,045,028 A | * | 4/2000 | Martin et al. | 228/112.1 |
| 6,284,058 B1 | * | 9/2001 | Santella et al. | 148/242 |
| 6,659,331 B1 | * | 12/2003 | Thach et al. | 228/112.1 |
| 2004/0031140 A1 | * | 2/2004 | Arnold et al. | 29/526.4 |

FOREIGN PATENT DOCUMENTS

| | | | |
|---|---|---|---|
| JP | SU-33821 A | * | 5/1985 |
| JP | 61-79756 A | * | 4/1986 |
| JP | 2003-193264 A | * | 7/2003 |

OTHER PUBLICATIONS

A.P. Alkhimov, V.F. Kosarev, and A.N. Papyrin; *A method of "cold" gas-dynamic deposition;* Dokl. Akad. Nauk SSSR 315, 1062-1065; Dec. 1990; pp. 1047-1049.

* cited by examiner

*Primary Examiner*—Lynne R. Edmondson
(74) *Attorney, Agent, or Firm*—Alston & Bird LLP

(57) ABSTRACT

A method for coating and an associated assembly including such a coating are provided. The assembly includes a workpiece defining a weld portion, such as a friction weld joint and a heat affected zone. A coating is disposed on the weld portion to at least partially cover the weld portion, thereby providing enhanced corrosion resistance to the workpiece.

19 Claims, 3 Drawing Sheets

ALUMINUM COATING FOR THE CORROSION PROTECTION OF WELDS

BACKGROUND OF THE INVENTION

1) Field of the Invention

The present invention relates to the coating of a workpiece and, more particularly, to the coating of a portion of a workpiece with aluminum to provide corrosion resistance.

2) Description of Related Art

Friction welding is a known process for forming joints and/or changing the grain structure in a workpiece. For example, friction stir welding is a process in which a rotating tool, such as a pin or probe, is urged into and/or through a workpiece, e.g., to join multiple structural members of the workpiece in a solid state or to repair cracks in a workpiece. As shown in FIG. 1, the probe 12 of the friction stir welding tool 10 typically extends from a shoulder 14, which can be flat, concave, or otherwise contoured, and the shoulder 14 is urged against the workpiece 20 so that the probe 12 is urged into the workpiece 20 at the interface 22 of the abutting structural members 24, 26 that make up the workpiece 20. The probe 12 is then urged along the interface 22 to form a continuous weld joint 28. For example, according to one conventional friction stir welding process for forming a butt joint, a friction stir welding machine 30, which controls the rotation and movement of the tool 10, urges the probe 12 in a direction 16 and into the interface 22 between the two structural members 24, 26. The rotating tool 10 is then moved in a direction 18 along the interface 22. The motion of the rotating tool 10 generates frictional and deformation heating, thereby forming a region of plasticized material in the structural members 24, 26. In some cases, the tool 10 is tilted, such as approximately 2.5°, relative to the structural members 24, 26 so that the trailing edge of the shoulder 14 is thrust into the plasticized material. Upon cooling of the plasticized material, the members 24, 26 of the workpiece 20 are joined along the weld joint 28. Friction stir welding is further described in U.S. Pat. No. 5,460,317 to Thomas et al., the entire contents of which are incorporated herein by reference.

Friction stir welding has been demonstrated to be a successful joining method for forming certain types of joints, such as the butt joint shown in FIG. 1 or a lap joint in which the probe is inserted in a direction substantially perpendicular to the interface between overlapping structural members. In addition, other types of friction welding have also been shown to be useful for forming certain joints. However, in some cases, typical friction welding can result in a joint that exhibits a corrosion resistance that is less than desired. In particular, in some cases, the friction welded joint of the workpiece where the material has been mixed during friction welding can be more susceptible to corrosion than the areas of the workpiece remote from the joint. In addition, the heat associated with friction welding typically results in a heat affected zone proximate to the joint, where the heat of friction welding has affected the material properties of the workpiece. The heat affected zone can also be susceptible to corrosion. Alternatively, even if the joint and the heat affected zone of the workpiece are not more susceptible to corrosion than other parts of the workpiece, it may be desirable to increase the corrosion resistance of those portions of the workpiece. In some cases, the corrosion resistance of the friction weld joint, the heat affected zone, and/or other portions of the workpiece can be improved by thermally processing the workpiece. However, such thermal treatments generally increase the time and/or expense for manufacturing the workpiece.

Similarly, the corrosion resistance of other type of welds can be characterized by a corrosion resistance that is less than the desired corrosion resistance. Other welds include those formed by other types of solid state welding, arc welding, resistance welding, and the like.

Thus, there exists a need for an improved method for increasing the corrosion resistance of a weld joint, including joints formed by friction welding and other types of welding, and an associated workpiece having such an improved corrosion resistance. The method should be compatible with different configurations of welds.

BRIEF SUMMARY OF THE INVENTION

The present invention provides a method for disposing a coating of an aluminum material on a weld portion of a workpiece. The coating can increase the corrosion resistance of the workpiece.

According to one embodiment of the present invention, the workpiece is friction welded, such as by friction stir welding, to form a friction weld portion. The aluminum material can be deposited on the resulting friction weld joint as well as a heat affected zone proximate to the friction weld joint. The depositing step can be performed after the workpiece is friction welded. Alternatively, the depositing step can be performed first by disposing the aluminum material on a first surface of the workpiece and thereafter positioning the first surface against a second surface of the workpiece in a lap configuration and friction stir welding the first and second surfaces in the lap configuration. The aluminum material can be pure aluminum, such as at least about 99% aluminum, and can be used to coat workpieces formed of materials that include, for example, aluminum or steel. In other embodiments of the present invention, the workpiece can be welded by other types of solid state welding or by arc welding, resistance welding, solid state welding, oxygen gas welding, oxyfuel gas welding, brazing, soldering, and the like.

For example, the aluminum material can be deposited by a cold spraying operation in which a mixed stream of gas and particles of the aluminum material at a temperature less than a melting temperature of the aluminum material is directed toward the workpiece so that the aluminum material is deposited on the workpiece. Further, the aluminum material can be selectively deposited on the workpiece, e.g., substantially only on the weld portion of the workpiece. According to one aspect of the invention, the particles of the aluminum material are between about 1 and 50 microns in diameter, and the coating of the aluminum material can have a thickness of between about 0.001 inch and 0.01 inch on the workpiece.

According to another embodiment, the present invention provides an assembly having a corrosion resistant coating. The assembly includes a workpiece with a weld portion, such as a friction weld portion, and a coating of an aluminum material disposed thereon. The coating can be disposed on one or more outer surfaces of the workpiece and/or between opposed surfaces of the workpiece. Further, the coating can substantially cover a friction weld joint and a heat affected zone proximate to the friction weld joint.

The workpiece can be formed of materials such as aluminum or steel, and different members of the workpiece can be formed of dissimilar materials. The coating can be formed of aluminum materials such as at least 99% pure aluminum. In some cases, the coating can be disposed substantially only on the weld portion of the workpiece, and the coating can have a thickness of between about 0.001 inch and 0.01 inch.

BRIEF DESCRIPTION OF THE SEVERAL VIEWS OF THE DRAWINGS

Figure 1:
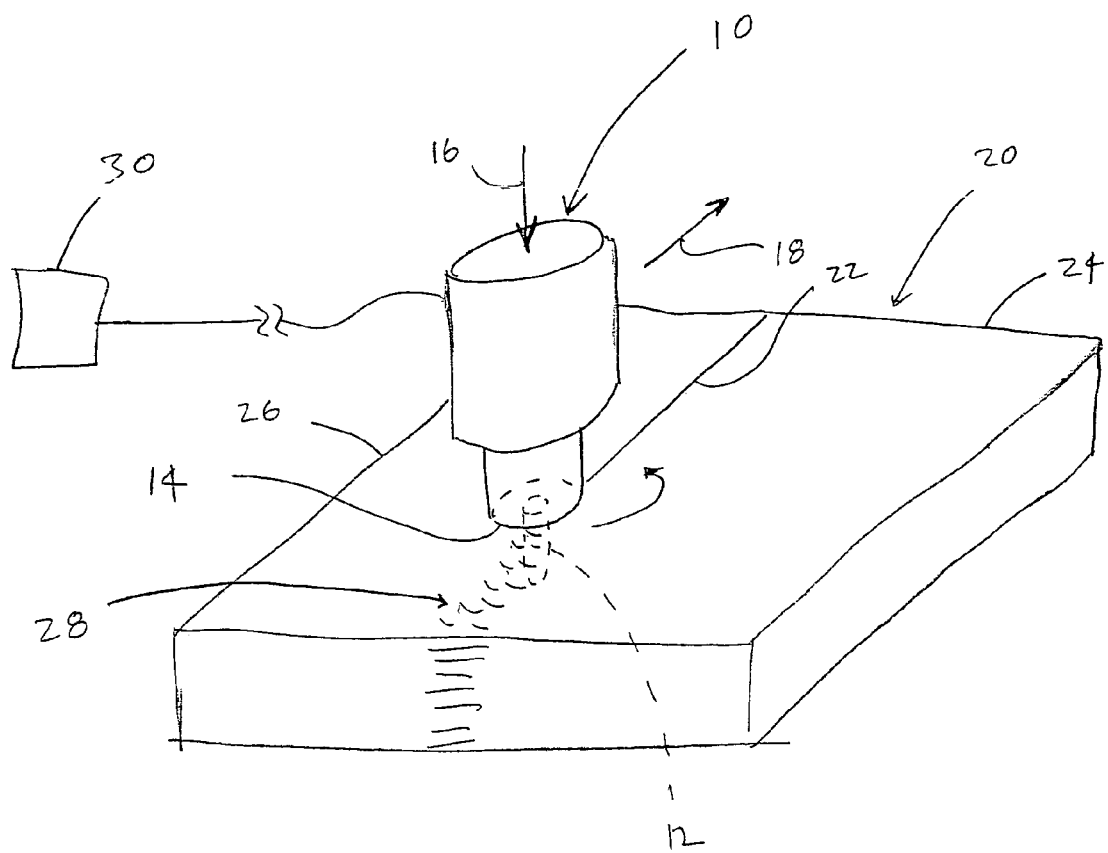
Figure 2:
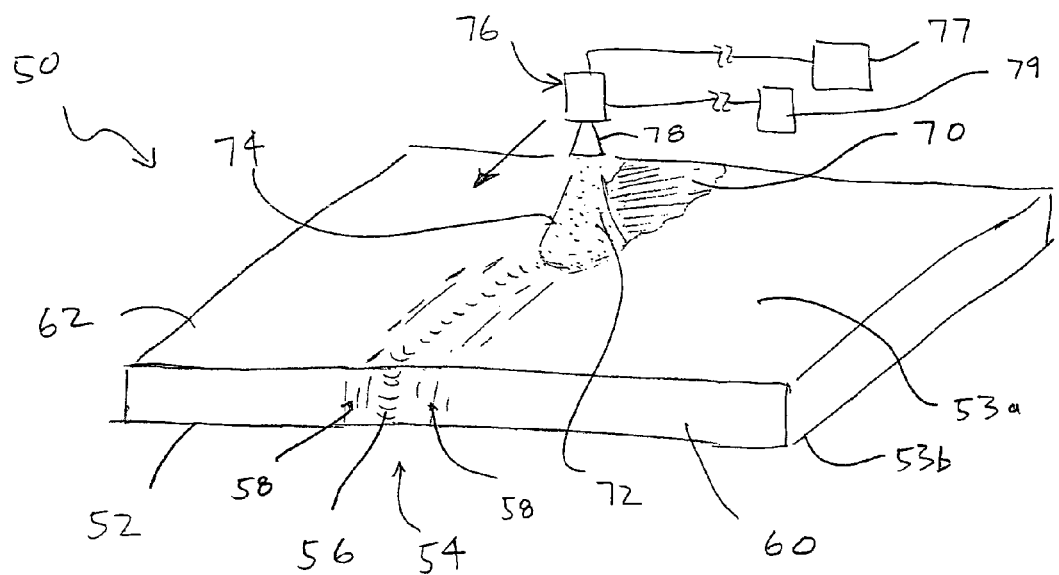
Figure 3:
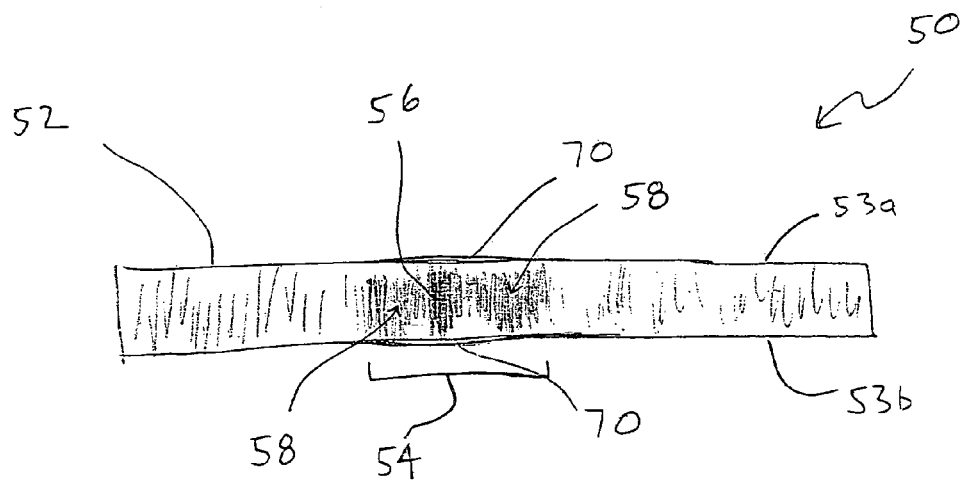

Having thus described the invention in general terms, reference will now be made to the accompanying drawings, which are not necessarily drawn to scale, and wherein:

FIG. 1 is a perspective view illustrating a conventional friction stir welding device configured to form a friction stir weld butt joint between two abutting structural members;

FIG. 2 is a perspective view illustrating a coating being applied to a workpiece according to one embodiment of the present invention;

FIG. 3 is a section view illustrating the workpiece of FIG. 2; and

Figure 4:
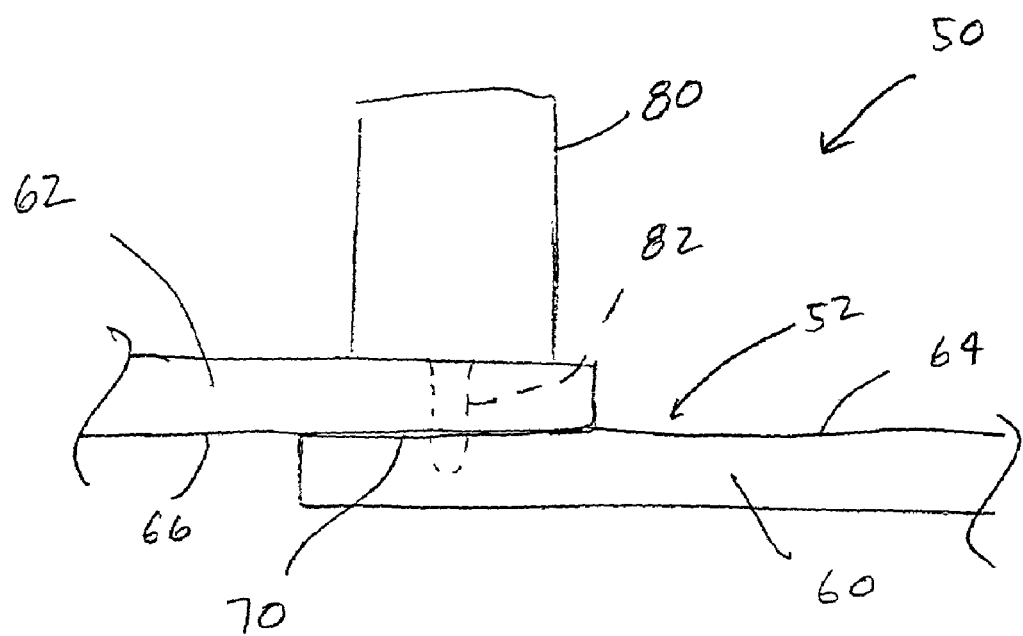

FIG. 4 is a perspective view illustrating a coated workpiece being friction welded in a lap configuration according to another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the figures, and in particular to FIGS. 2 and 3, there is illustrated an assembly 50 according to one embodiment of the present invention. The assembly 50 is formed of a workpiece 52 with a coating 70 of an aluminum material disposed thereon. The workpiece 52 can include one or more structural members, each of which can be any of a variety of structures, such as a planar plate or sheet, as illustrated in FIG. 2. Alternatively, the workpiece 52 can have other configurations, including, for purposes of example only and not limitation, curved plates or sheets, blocks having rectangular or square cross-sections, tubes, cylinders, angles, channels, irregular geometric configurations, and the like. The workpiece 52 can be formed from a variety of fabricating processes, as is known in the art, including milling, casting, or forging.

The workpiece 52 includes at least one weld portion 54. The weld portion 54 can be formed by friction welding, other types of solid state welding, arc welding, resistance welding, solid state welding, oxygen gas welding, oxyfuel gas welding, brazing, soldering, and the like. Typically, the weld portion 54 defines a joint 56 between multiple structural members that form the workpiece 52. For example, as shown in FIGS. 2 and 3, the workpiece 52 is formed of two structural members 60, 62 that are configured in abutting contact with a stir weld joint 56 formed therebetween. However, according to other embodiments of the present invention, the workpiece 52 can be formed of any number of structural members that are connected in various configurations. Further, in some cases, the weld portion 54 can be formed without joining multiple members of the workpiece. For example, the weld portion 54 can be formed in a single member, e.g., by processing the workpiece with a friction stir welding tool to modify the granular structure of the workpiece, i.e., by refining the grain size of the material of the workpiece.

The workpiece 52 can be formed of various materials. For example, according to one embodiment of the present invention, the workpiece 52 is formed of aluminum; an aluminum alloy such as aluminum alloyed with zinc, e.g., 7075 aluminum-zinc alloy; steel; or other metals. Further, the workpiece 52 can be formed of dissimilar materials. For example, the structural members 60, 62 of the workpiece 52 can be formed of different metals that are joined by the weld joint 56. Typically, the workpiece 52 is formed of a metal that is at least minimally susceptible to corrosion when subjected to certain conditions, such that the coating 70 on the weld portion 54 of the workpiece 52 prevents or slows the occurrence of corrosion of the workpiece 52 coincident with the weld portion 54. For example, if the workpiece is formed of 7075 aluminum-zinc alloy, the welded portion 54 may corrode faster than the unwelded portions of the workpiece 52 when subjected to various corrosive media, such as salt fog.

The weld portion 54 can be formed by various types of welding, as noted above. Where the weld portion 54 is a friction weld portion, the weld portion 54 can be formed by various types of friction welding. For example, the weld joint 56 between the abutting structural members 60, 62 of the workpiece 52 of FIGS. 2 and 3 can be a friction weld joint that is formed by friction stir welding, i.e., using a friction stir welding device such as the tool 10 illustrated in FIG. 1. Alternatively, the weld portion 54 can be formed by other types of frictional welding such as inertia friction welding, linear friction welding, reciprocating motion friction welding, friction plug welding, and the like. Typically, a friction weld portion includes the weld joint 56 as well as a heat affected zone 58 proximate to the joint 56, as illustrated in FIGS. 2 and 3. In the context of a friction weld portion, the weld joint 56 generally refers to that portion of the workpiece 52 where the material of the workpiece 52 has been plasticized and mixed during the friction weld operation. The heat affected zone 58 generally refers to that portion of the workpiece 52 in which the heat associated with the frictional welding operation has affected the material properties of the workpiece 52 even though the material of the workpiece 52 has not been plasticized. Thus, for a typical friction stir welding operation, the weld joint 56 occurs immediately proximate to the friction stir welding tool, and the heat affected zone 58 occurs proximate to the joint 56 and opposite the joint 56 from the probe.

The aluminum material is deposited onto the workpiece 52, and thereby bonded with the workpiece 52, according to any of a variety of types of deposition operations. For example, the aluminum material can be deposited by cold spraying, plasma deposition, ion vapor deposition, and the like. In some cases, the aluminum material can be provided as particles that are mixed with a gas and sprayed onto a surface of the workpiece 52. For example, FIG. 2 illustrates a cold spraying operation in which the aluminum material is provided as particles 72 that are mixed with a gas and accelerated to form a mixed stream 74. The mixed stream 74 is then directed toward the workpiece 52 so that the particles 72 of the aluminum material impinge upon one or more outer surfaces 53a, 53b of the workpiece 52 and are bonded thereto to form the coating 70. As shown in FIG. 2, a spraying apparatus 76 is configured to provide the mixed stream 74, including the gas and the particles 72 of the aluminum material. The gas and aluminum material can be provided by one or more source 77. The mixed stream 74 is directed through a nozzle 78 toward the weld portion of the workpiece 52 onto which it is desired to dispose the aluminum material. The relative position of the nozzle 78 and the workpiece 52 can be adjusted during the spraying operation, e.g., manually or by a controller 79, so that the spraying apparatus 76 disposes the aluminum material onto the workpiece 52 along the weld portion 54.

The gas and, hence, the particles 72 of the aluminum material can be directed through the nozzle 78 and toward the workpiece 52 at a range of speeds. For example, in some embodiments of the invention, the gas flows at a speed of between about 300 and 1300 meters/second. Thus, the gas can flow at a subsonic speed, sonic speed, or supersonic speed. It is appreciated that the nozzle 78 can define converging and/or diverging portions, and that the desired speed of the mixed stream 74 can be achieved by adjusting the size or configuration of the nozzle 78 or by adjusting the pressure of the gas delivered to the spraying apparatus 76.

The term "cold spraying" generally refers to an operation in which the particles 72 and/or the gas are disposed without heating or, more typically, heated to a temperature that is below the melting temperature of the aluminum material so that the particles 72 are softened but do not generally melt. For example, according to one embodiment of the present invention, the gas is heated to a temperature of about 750° F., before or after the particles 72 of aluminum material are introduced to the gas such that the particles 72 are also heated. In this regard, the spraying apparatus 76 can include a heater (not shown) for heating the gas and/or the particles 72 to facilitate plastic deformation of the particles 72 upon impacting the workpiece 52. In either case, as the particles 72 impact upon the workpiece 52, the particles 72 of the aluminum material deform, at least partially flattening against the workpiece 52 and sticking to the workpiece 52. Cold spraying is further described in U.S. Pat. No. 5,302,414 to Alkhimov, et al. and U.S. Application No. 2002/0168466 A1 to Tapphorn, et al.

The operational characteristics of the cold spraying process can be selected or adjusted according to the particular spraying process to be performed. In particular, such adjustable operational characteristics include the type and flow rate of the gas; the amount of the aluminum material provided in the mixed stream 74; the speed and temperature of the mixed stream 74; the size, profile, and configuration of the nozzle 78; the preparation of the surfaces of the workpiece 52; the relative position and motion of the spraying apparatus 76 and the workpiece 52; and the like. These and other operational characteristics of the cold spraying process can be adjusted according to such factors as the type of material of the workpiece 52 and the aluminum material; the size of the particles 72 of the aluminum material; the desired amount and configuration of the aluminum material to be deposited on the workpiece 52; other operational characteristics of the cold spraying process; and the like. For example, if the aluminum material has a relatively high melting temperature, the temperature of the gas can be increased so that the particles 72 of the aluminum material are sufficiently deformed upon impact with the workpiece 52 and bonded thereto. Similarly, for relatively larger sized particles 72 of the aluminum material, the speed of the mixed stream 74 or the temperature of the aluminum material and the gas can be increased. Further, the amount of the aluminum material provided in the mixed stream 74 can be increased to deposit an increased amount of the aluminum material on the workpiece 52. Similarly, the motion of the spraying apparatus 76 relative to the workpiece 52 can be decreased so that the nozzle 78 directs more of the aluminum material onto any particular portion of the workpiece 52, thereby increasing the amount of aluminum material disposed on that portion of the workpiece 52.

According to one embodiment of the present invention, the particles 72 of the structural material are formed of pure aluminum, such as aluminum having a purity of at least about 99%. Alternatively, the aluminum material of the particles 72 can be formed of an aluminum alloy including, but not limited to, 1000 series aluminum and 6000 series aluminum such as 6061 aluminum.

A variety of gases can be used for forming the mixed stream 74 and propelling the particles 72 of the aluminum material toward the workpiece 52. For example, inert gases such as helium, or argon can be accelerated and mixed with the aluminum material in the spraying apparatus 76 such that the stream 74 is emitted from the nozzle 78 of the apparatus 76 as a mixture of the particles 72 and the inert gas. Alternatively, the gas used for forming the mixed stream 74 and depositing the aluminum material on the workpiece 52 can include other gases such as hydrogen and/or nitrogen. For example, the gas can be pure hydrogen, hydrogen with trace amounts of other gases, or a mixture of hydrogen and one or more additional gases such as nitrogen.

The coating 70 is illustrated in FIG. 3 with an exaggerated thickness for purposes of illustrative clarity, and it is understood that any thickness of the structural material can be disposed on the workpiece 52. In some embodiments of the present invention, the thickness of the coating 70 can be relatively thin, e.g., between about 0.001 inch and 0.01 while still providing a desired corrosion resistance to the workpiece 52. For example, in three tests conducted according to an embodiment of the present invention, sample workpieces 52 formed of friction stir welded members of 7050 aluminum alloy were coated with pure aluminum. The coatings 70 on the three test samples were formed with thicknesses of about 0.002 inch, 0.004 inch, 0.006 inch, respectively, and each test sample similarly exhibited an improved corrosion resistance. As shown in FIG. 3, the coating 70 can be deposited on multiple outer surfaces 53a, 53b of the workpiece 52. Further the coating 70 of the aluminum material can be selectively provided, e.g., to substantially cover the weld portion 54 including the joint 56 and the heat affected zone 58 but excluding the other portions of the workpiece 52 that are remote from the weld joint 56.

While the workpiece 52 of FIGS. 2 and 3 is configured to define an abutting weld joint 56 therebetween, the workpiece 52 can define various other configurations. For example, FIG. 4 illustrates an embodiment in which the structural members 60, 62 of the workpiece 52 are positioned in an overlapping, or "lap," configuration. That is, surfaces 64, 66 of the structural members 60, 62 are positioned in an opposing configuration, with the coating 70 of the aluminum material disposed therebetween. The coating 70 of the aluminum material can be deposited on one or both of the surfaces 64, 66, such as by directing the cold spraying apparatus 76 of FIG. 2 toward one or both of the surfaces 64, 66 before the structural members 60, 62 are positioned in the lap configuration. With the workpiece 52 configured as shown in FIG. 4, the opposed surfaces 64, 66 are connected, e.g., by a friction stir welding probe 82 of a rotatable friction stir welding tool 80 extending at least partially through each of the structural members 60, 62 and generally perpendicular through the coating 70 at the interface of the members 60, 62. Thus, the coating 70 of the aluminum material can provide corrosion protection to the opposed surfaces 64, 66 of the structural members 60, 62. The aluminum material can also be disposed on other portions of the structural members 60, 62, such as on outer surfaces opposite the surfaces 64, 66.

In some cases, the workpiece 52 can be subjected to additional processing operations before or after the deposition of the aluminum material. Such processing operations can include various thermal treatments for attaining desired material properties in the workpiece 52 or the coating 70. For example, according to one such thermal process, the workpiece 52 can be heated to an elevated temperature such as about 900° F., quenched in a relatively cool liquid, then heated to about 200° F. for a duration of several hours. In addition, or alternative, the workpiece 52 can be machined before or after the coating process to a predetermined configuration by any known means, including using a manual or computer-guided machining device, such as a computer numeric control (CNC) machine. Further, the workpiece 52 can be heated and subjected to a sub-atmospheric pressure in a vacuum annealing operation to remove gases trapped in the workpiece 52 and/or the coating 70. For example, such sub-atmospheric processing can be used to diffuse hydrogen out of a titanium workpiece. In some cases, such as where the workpiece is formed of steel, hydrogen can be diffused out of the workpiece simply by heating the workpiece, i.e., even without subjecting the workpiece to a sub-atmospheric pressure.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing a corrosion resistant coating on a workpiece, the method comprising:
   providing a workpiece defining a weld portion by friction welding the workpiece to form the weld portion; and
   subsequently depositing particles of an aluminum material onto the weld portion of the workpiece to thereby form a coating of the aluminum material on the weld portion of the workpiece.

2. A method according to claim 1 wherein the providing step comprises forming the weld portion of the workpiece, the weld portion including a friction weld joint and a heat affected zone proximate to the friction weld joint.

3. A method according to claim 1 wherein said friction welding step comprises friction stir welding the workpiece to form the weld portion defining a friction weld joint and a heat affected zone, and said depositing step comprises substantially covering the weld portion.

4. A method according to claim 1 wherein said providing step comprises providing the workpiece, the workpiece comprising at least one of the group consisting of aluminum and steel.

5. A method according to claim 1 further comprising providing the particles of the aluminum material, the particles being formed of at least 99% aluminum.

6. A method according to claim 1 wherein said depositing step comprises directing a mixed stream of gas and particles of the aluminum material toward the workpiece such that the aluminum material is deposited on the workpiece, the mixed stream having a temperature less than a melting temperature of the aluminum material.

7. A method according to claim 1 wherein said depositing step comprises:
   introducing the particles of the aluminum material into a gas;
   mixing the gas and particles to form a mixed steam having a temperature less than a melting temperature of the aluminum material; and
   directing the mixed stream of the gas and particles toward the workpiece such that the aluminum material is deposited on the workpiece.

8. A method according to claim 7 further comprising providing the particles of the aluminum material, the particles being between about 1 and 50 microns in diameter.

9. A method according to claim 1 further comprising heating the particles to a temperature less than the melting temperature of the aluminum material.

10. A method according to claim 7 wherein said mixing step comprises accelerating the gas and particles to a supersonic speed.

11. A method according to claim 1 wherein said depositing step comprises selectively depositing the aluminum material on the weld portion of the workpiece.

12. A method according to claim 1 wherein said depositing step comprises disposing a coating of the aluminum material having a thickness of between about 0.00 1 inch and 0.01 inch on the weld portion of the workpiece.

13. A method according to claim 1 further comprising processing the workpiece, wherein said processing step comprises a material treatment selected from the group consisting of hot isostatic pressing, heat treating, aging, quenching, stretching, annealing, and solution annealing.

14. A method for providing a corrosion resistant coating on a workpiece, the method comprising:
   depositing particles of an aluminum material onto at least a first surface of the workpiece by spraying the particles onto the first surface to thereby form a coating of the aluminum material on the first surface of the workpiece; and
   friction stir welding at least a portion of the first surface of the workpiece after said depositing step to thereby form a weld portion.

15. A method according to claim 14 wherein said welding step comprises positioning the first surface against a second surface of the workpiece in a lap configuration and friction welding the first and second surfaces in the lap configuration.

16. A method according to claim 14 further comprising providing the workpiece, the workpiece comprising at least one of the group consisting of aluminum and steel.

17. A method according to claim 14 further comprising providing the particles of the aluminum material, the particles being formed of at least 99% aluminum.

18. A method according to claim 14 wherein said depositing step comprises disposing a coating of the aluminum material having a thickness of between about 0.001 inch and 0.01 inch on the first surface of the workpiece.

19. A method according to claim 14 wherein said depositing step comprises cold spraying the aluminum particles onto the first surface.

* * * * *

UNITED STATES PATENT AND TRADEMARK OFFICE
CERTIFICATE OF CORRECTION

PATENT NO. : 7,066,375 B2  
APPLICATION NO. : 10/833358  
DATED : June 27, 2006  
INVENTOR(S) : Bolser Page 1 of 1

It is certified that error appears in the above-identified patent and that said Letters Patent is hereby corrected as shown below:

Column 8,  
Line 8, "steam" should read --stream--.

Signed and Sealed this

Fifth Day of December, 2006

JON W. DUDAS  
*Director of the United States Patent and Trademark Office*